United States Patent
Yamanishi et al.

(10) Patent No.: US 12,528,222 B2
(45) Date of Patent: Jan. 20, 2026

(54) WORKING MACHINE

(71) Applicant: Makita Corporation, Anjo (JP)

(72) Inventors: Shunsuke Yamanishi, Anjo (JP); Sho Tsuda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 120 days.

(21) Appl. No.: 18/664,526

(22) Filed: May 15, 2024

(65) Prior Publication Data

US 2024/0399612 A1 Dec. 5, 2024

(30) Foreign Application Priority Data

May 31, 2023 (JP) .................................. 2023-089935

(51) Int. Cl.
| | | |
|---|---|---|
| *B23D 45/16* | (2006.01) | |
| *B27G 19/04* | (2006.01) | |
| *B28D 1/04* | (2006.01) | |
| *B28D 7/02* | (2006.01) | |

(52) U.S. Cl.
CPC ............. *B27G 19/04* (2013.01); *B23D 45/16* (2013.01); *B28D 1/045* (2013.01); *B28D 7/02* (2013.01)

(58) Field of Classification Search
CPC .......... B27G 19/04; B28D 7/02; B28D 1/045; B23D 45/16; B26B 29/00
See application file for complete search history.

(56) References Cited

U.S. PATENT DOCUMENTS

| | | | | |
|---|---|---|---|---|
| 5,531,147 | A * | 7/1996 | Serban ................... | B27G 19/02 144/251.1 |
| 6,739,060 | B1 * | 5/2004 | Huang ...................... | B27B 9/00 125/13.01 |
| 6,971,297 | B1 * | 12/2005 | Meredith ............... | B27G 19/02 83/490 |
| 8,813,375 | B2 * | 8/2014 | Okumura ............... | B27G 19/04 30/388 |
| 9,805,639 | B2 * | 10/2017 | Kim ...................... | G06F 1/1652 |
| 2011/0107892 | A1 * | 5/2011 | Imamura .............. | B23D 45/048 83/471.2 |
| 2018/0319004 | A1 * | 11/2018 | Strömbäck ............. | B23D 45/16 |
| 2022/0063039 | A1 * | 3/2022 | Nomura ................. | B23Q 11/08 |

FOREIGN PATENT DOCUMENTS

| | | |
|---|---|---|
| EP | 3 556 512 A1 | 10/2019 |
| JP | 2019-188606 A | 10/2019 |

* cited by examiner

*Primary Examiner* — Carib A Oquendo
(74) *Attorney, Agent, or Firm* — Sughrue Mion, PLLC

(57) ABSTRACT

A working machine may include a rotary blade, an output shaft, a prime mover, a working machine body, a blade cover, and a cover retainment mechanism rotatably supporting the blade cover about a cover rotation axis. The cover retainment mechanism may include a first member including a first cylindrical portion enclosing the output shaft, an outer thread defined in an outer circumferential surface of the first cylindrical portion, and a first cover support portion supporting the blade cover in a first direction which is along the cover rotation axis and a second member including a second cylindrical portion disposed radially outside the first cylindrical portion, an inner thread defined in an inner circumferential surface of the second cylindrical portion and onto which the outer thread is screwed, and a second cover support portion supporting the blade cover in a second direction which is opposite to the first direction.

9 Claims, 7 Drawing Sheets

WORKING MACHINE

REFERENCE TO RELATED APPLICATIONS

This application claims priority from Japanese Patent Application No. 2023-89935 filed on May 31, 2023. The entire content of the priority application is incorporated herein by reference.

TECHNICAL FIELD

Art disclosed herein relates to a working machine.

BACKGROUND ART

Japanese Patent Application Publication No. 2019-188606 describes a working machine including a rotatory blade configured to cut an object, an output shaft to which the rotary blade is attached, a prime mover configured to rotate the output shaft, a working machine body that rotatably supports the output shaft and houses the prime mover, a blade cover partially covering the rotary blade, and a cover retainment mechanism disposed on the working machine body and rotatably supporting the blade cover about a cover rotation axis. The cover retainment mechanism includes a pair of clamp members configured to clamp the blade cover and screw members configured to fasten the pair of clamp members. In this cover retainment mechanism, a hole for avoiding interference with the output shaft and holes for attaching the screw members are defined separately from each other in the pair of clamp members.

SUMMARY

In the configuration of the working machine described in Japanese Patent Application Publication No. 2019-188606, a size of the cover retainment mechanism may increase in the radial direction of the cover rotation axis. In addition, due to the size increase of the cover retainment mechanism in the radial direction, the maximum cutting depth of the rotary blade may become smaller. The present disclosure provides a technique that can increase a maximum cutting depth of a rotary blade.

A working machine disclosed herein may comprise a rotary blade configured to cut an object, an output shaft to which the rotary blade is attached, a prime mover configured to rotate the output shaft, a working machine body that rotatably supports the output shaft and houses the prime mover, a blade cover partially covering the rotary blade, and a cover retainment mechanism disposed on the working machine body and rotatably supporting the blade cover about a cover rotation axis. The cover retainment mechanism may comprise a first member including a first cylindrical portion enclosing the output shaft, an outer thread defined in an outer circumferential surface of the first cylindrical portion, and a first cover support portion supporting the blade cover in a first direction which is along the cover rotation axis and a second member including a second cylindrical portion disposed radially outside the first cylindrical portion, an inner thread defined in an inner circumferential surface of the second cylindrical portion and onto which the outer thread is screwed, and a second cover support portion supporting the blade cover in a second direction which is opposite to the first direction.

According to the above configuration, by allowing the output shaft to extend through inside the first cylindrical portion, the cover retainment mechanism can avoid interfering with the output shaft. Then, by screwing the outer thread defined in the outer circumferential surface of the first cylindrical portion onto the inner thread of the second member, the blade cover can be clamped between the first and second members. Therefore, there is no need to prepare the screw members as disclosed in Japanese Patent Application Publication No. 2019-188606. Accordingly, there is also no need to define the holes for attaching the screw members, by which the cover retainment mechanism can be downsized in the radial direction of the cover rotation axis. Therefore, the maximum cutting depth of the rotary blade can be increased.

DESCRIPTION

Figure 1:
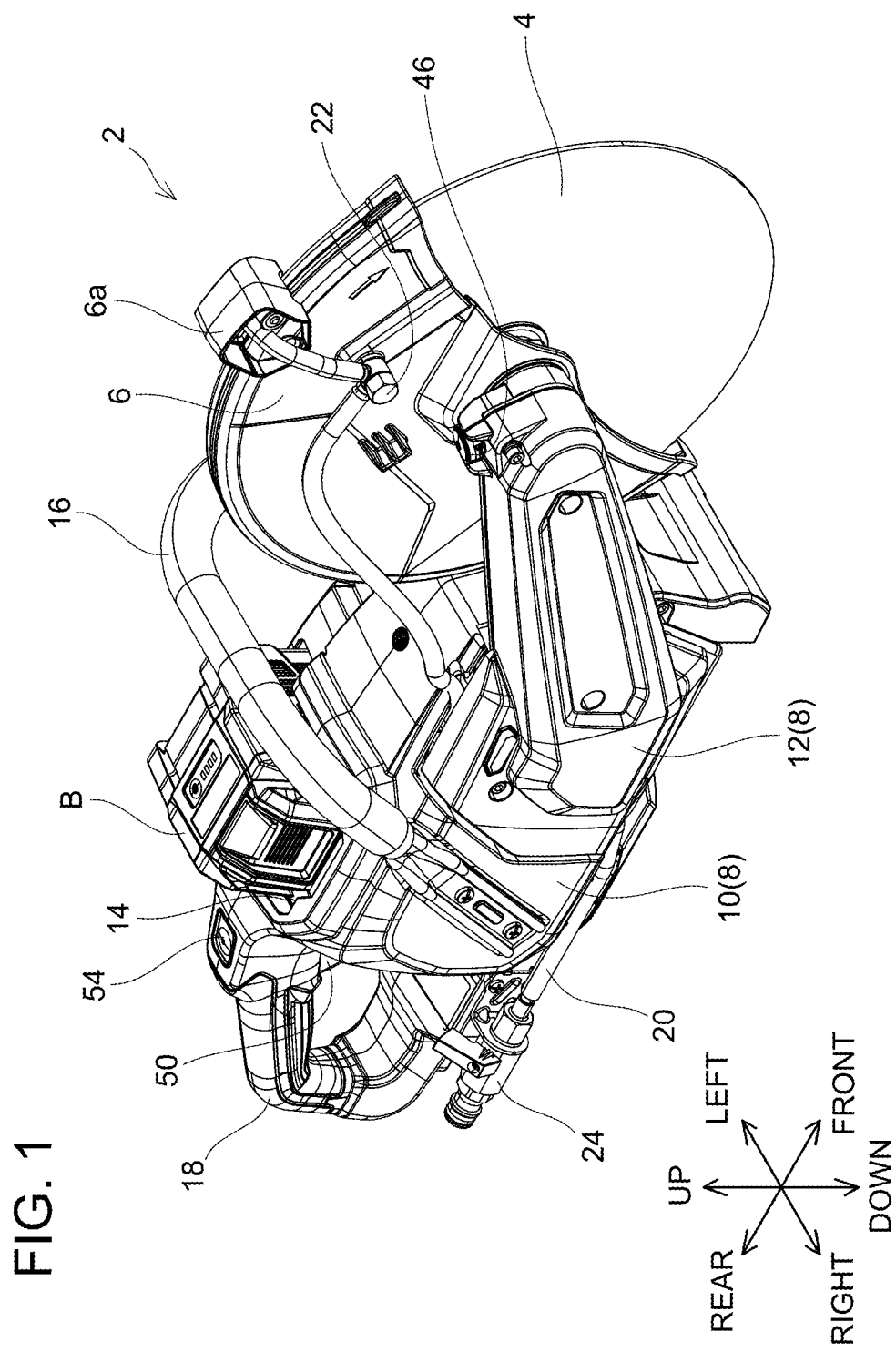
FIG. 1 illustrates a perspective view of an entirety of a power cutter 2 of an embodiment as viewed from the front right upper side.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved working machines as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, each of the first cover support portion and the second cover support portion may support the blade cover over a substantially complete angle about the cover rotation axis.

If the first cover support portion and the second cover support portion do not support the blade cover over the substantially complete angle about the cover rotation axis, the blade cover may wobble with respect to the working machine body. According to the above configuration, each of the first cover support portion and the second cover support portion supports the blade cover over the substantially complete angle about the cover rotation axis. This suppresses the blade cover from wobbling with respect to the working machine body.

In one or more embodiments, the working machine may further comprise a bearing rotatably supporting the output shaft. The first member may further include a first bearing contact portion contacting the bearing in the first direction. The second member may further include a second bearing contact portion contacting the bearing in the second direction.

According to the above configuration, the cover retainment mechanism also functions as a bearing detent by clamping the bearing. Therefore, there is no need to provide a separate bearing detent, thus the number of parts of the working machine can be reduced.

In one or more embodiments, the outer thread, the inner thread, and the bearing may overlap each other when viewed in a direction orthogonal to the cover rotation axis.

According to the above configuration, the cover retainment mechanism can be downsized in the axial direction of the cover rotation axis.

In one or more embodiments, an elastic member may be disposed between the first cover support portion and the blade cover and/or between the second cover support portion and the blade cover.

It is expected that a hard material (e.g., metal) is used for each of the first member, the second member, and the blade cover. Therefore, if the first cover support portion (and/or the second cover support portion) and the blade cover are in contact with each other, each of the first cover support portion (and/or the second cover support portion) and the blade cover will be significantly worn as the blade cover rotates. According to the above configuration, the elastic member with relatively low hardness is provided between the first cover support portion (and/or the second cover support portion) and the blade cover. Therefore, wear of the first cover support portion (and/or the second cover support portion) and the blade cover can be suppressed. Furthermore, according to the above configuration, wobbling of the blade cover with respect to the working machine body can be suppressed.

In one or more embodiments, the working machine may further comprise a rotary blade support mechanism disposed on the output shaft and retaining the rotary blade such that the rotary blade is fixed to the output shaft. When viewed in a direction orthogonal to a rotation axis of the output shaft, an outer circumferential surface of a portion of the cover retainment mechanism between the rotary blade and the blade cover may be located inward in a radial direction of the rotation axis of the output shaft relative to an outer circumferential surface of the rotary blade support mechanism.

According to the above configuration, the cover retainment mechanism can be downsized to the extent that it does not affect the maximum cutting depth of the rotary blade. This allows the maximum cutting depth of the rotary blade to be as large as possible.

In one or more embodiments, at least one of the first member and the second member may include a polygonal prismatic shape of which central axis extends along the cover rotation axis.

If the first and second members do not have a polygonal prismatic shape, the first and second members cannot be held by a tool such as a wrench. In this case, it may be difficult for the manufacturer of the working machine (specifically, a person who assembles the working machine) to fasten the outer and inner threads with sufficient fastening torque. According to the above configuration, at least one of the first member and the second member has a polygonal prismatic shape, thus at least one of the first member and the second member can be held by a tool such as a wrench. This makes it easier for the manufacturer of the working machine to fasten the outer and inner threads with sufficient fastening torque.

In one or more embodiments, at least one of the first member and the second member may be constituted of an aluminum alloy.

An aluminum alloys is relatively lightweight among metals. In addition, an aluminum alloy is easy to process into various shapes, including screws. According to the above configuration, an aluminum alloy is used for at least one of the first member and the second member. Therefore, a weight of at least one of the first member and the second member can be reduced. Furthermore, at least one of the first member and the second member can be easily processed.

Embodiments

Figure 2:
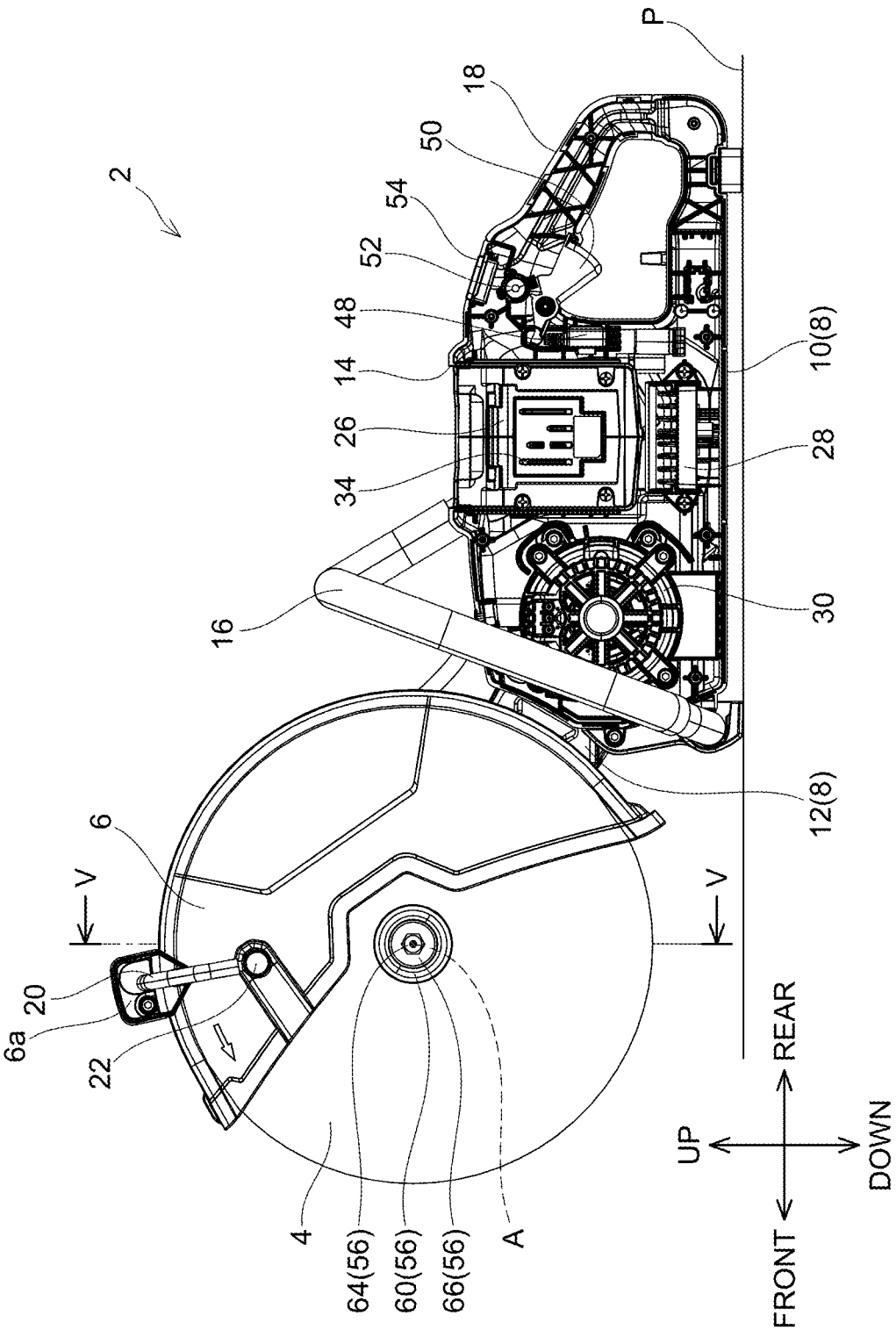
FIG. 2 illustrates an internal structure of a main housing 10 of the power cutter 2 of the embodiment as viewed from the left side.

As illustrated in FIG. 1, a working machine of the present embodiment is a power cutter 2. The power cutter 2 is a hand-held working machine that can be carried by a user. The power cutter 2 uses a rotary blade 4 having a plurality of cutting edges or grinding stones on its outer edge to cut an object, which is primarily a stone or steel material. A rechargeable battery pack B is detachably attached to the power cutter 2. The power cutter 2 operates on power supplied from the battery pack B. As illustrated in FIG. 2, the power cutter 2 can be placed on a flat surface P (e.g., the ground).

In the present disclosure, the forward, backward, upward downward, leftward, and rightward directions are defined based on the state where the power cutter 2 is placed on the surface P. Specifically, the direction orthogonal to the surface P and defined from the surface P toward the power cutter 2 is defined as the upward direction, and the direction from the power cutter 2 toward the surface P is defined as the downward direction. The direction orthogonal to the up-down direction and in which a rotation axis A of the rotary blade 4 (also referred to simply as axis A) extends is defined as a left-right direction. The direction orthogonal to the up-down and left-right directions and the direction in which the rotary blade 4 is directed is defined as the forward direction, and the opposite direction is defined as the rearward direction.

As illustrated in FIG. 1, the power cutter 2 includes a blade cover 6 that partially covers the rotary blade 4 and a power cutter body 8 that supports the rotary blade 4 and the blade cover 6. The blade cover 6 is rotatably attached to the power cutter body 8, as described in detail below. The blade cover 6 includes a handle 6a for the user to grasp. By grasping the handle 6a provided on the blade cover 6, the user can rotate the blade cover 6 relatively easily.

The power cutter body 8 includes a main housing 10 and a belt housing 12. An opening 14 is defined in the top surface of the main housing 10 into which the battery pack B can be inserted from above. The belt housing 12 extends forward and upward when viewed from the main housing 10.

The main housing 10 includes a front handle 16 that the user can grasp with one hand (e.g., left hand) and a rear handle 18 that the user can grasp with the other hand (e.g., right hand). The front handle 16 is a pipe-shaped member attached to the main housing 10. The front handle 16 extends primarily above and to the left of the main housing 10. The rear handle 18 is defined by a portion of the main housing 10. The rear handle 18 is positioned rearward of the front handle 16. The user can carry the power cutter 2 by grasping the front handle 16 with one hand and the rear handle 18 with the other hand.

A water supply hose 20 is attached to the blade cover 6. One end of the water supply hose 20 is connected to a side wall of the blade cover 6 via a plug 22. The other end of the water supply hose 20 has a water supply connector 24. The water supply connector 24 is fixed to the main housing 10 and is connected to an external water source, for example, a water faucet. The user can perform cutting operations with the power cutter 2 while supplying water to the inside of the blade cover 6 via the water supply hose 20.

Figure 3:
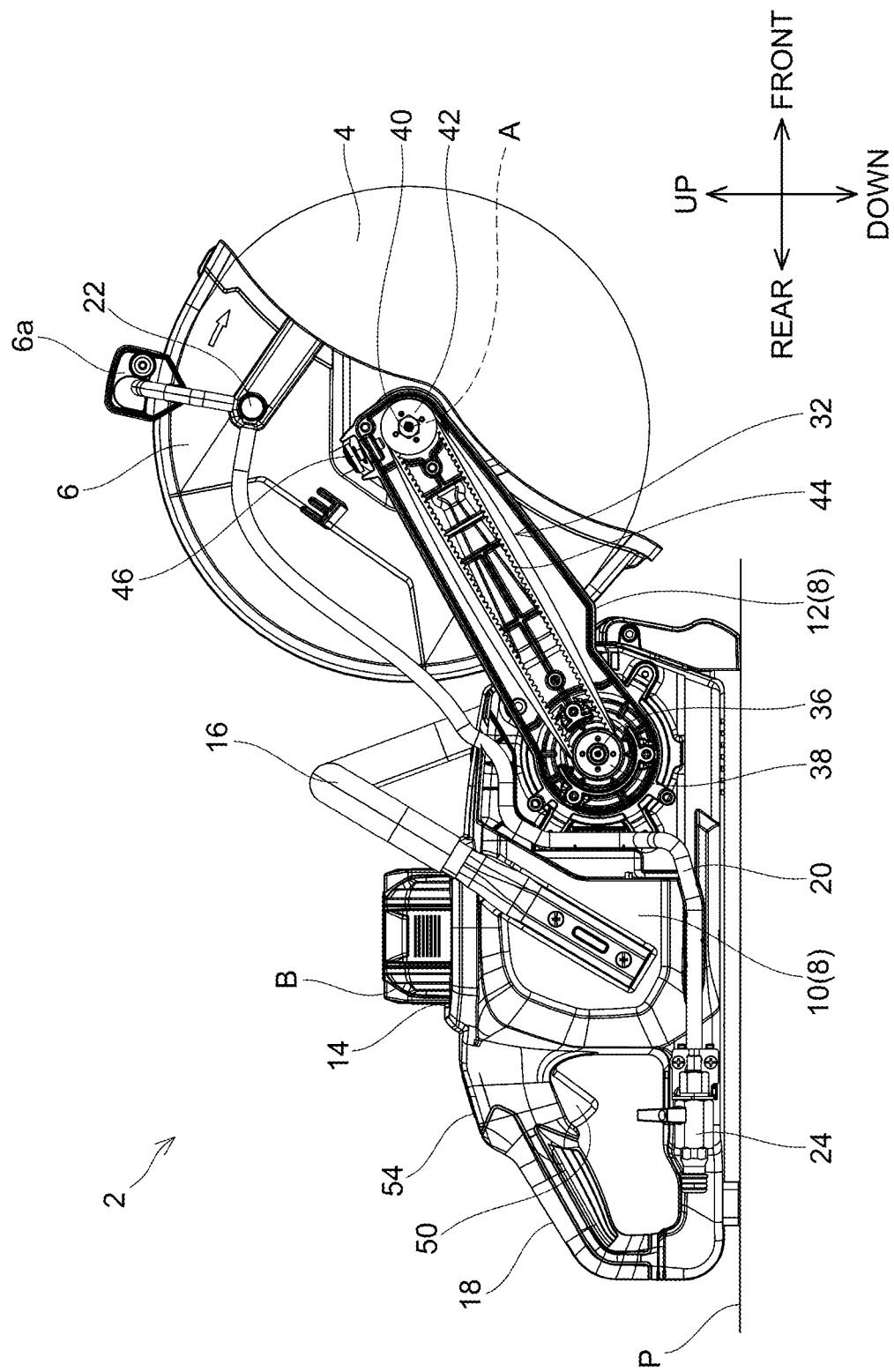
FIG. 3 illustrates an internal structure of a belt housing 12 of the power cutter 2 of the embodiment as viewed from the left side.

As illustrated in FIGS. 2 and 3, the power cutter 2 includes a power interface 26, a control unit 28, an electric motor 30, and a power transmission mechanism 32. As illustrated in FIG. 2, the power interface 26, the control unit 28, and the electric motor 30 are provided in the main housing 10. As illustrated in FIG. 3, the power transmission mechanism 32 is provided in the belt housing 12.

The power interface 26 illustrated in FIG. 2 is an interface for electrically connecting the battery pack B to the power cutter 2. The power interface 26 includes an external terminal 34 that is electrically connected to the control unit 28. When the battery pack B is attached to the power cutter 2, the external terminal 34 is connected to a connection terminal (not illustrated) on the battery pack B.

The control unit 28 controls operation of electrical components which the power cutter 2 includes. The control unit 28 includes, for example, an inverter circuit with switching elements and a control circuit that controls operation of the switching elements. The control unit 28 can control the operation of the electric motor 30 by adjusting the electric power supplied from the battery pack B and supplying the same to the electric motor 30.

The electric motor 30 is, for example, an inner rotor DC brushless motor. When electric power is supplied to the electric motor 30, the electric motor 30 rotates a motor shaft (not illustrated).

The power transmission mechanism 32 illustrated in FIG. 3 includes a planetary gear mechanism (not illustrated) connected to the aforementioned motor shaft (not illustrated), an input shaft 36 connected to the planetary gear mechanism, an input pulley 38 fixed to the input shaft 36, an output shaft 40 to which the rotary blade 4 is attached, an output pulley 42 fixed to the output shaft 40, and a transmission belt 44 wrapped over the input pulley 38 and output pulley 42. The planetary gear mechanism decelerates the rotation of the motor shaft and transmits the same to the input shaft 36. The input shaft 36 is rotatably supported by a bearing (not illustrated) provided in the belt housing 12 around an axis along the left-right direction. The input pulley 38 and the output pulley 42 are toothed pulleys, and the transmission belt 44 is a toothed belt. The teeth on the input pulley 38 mesh with the teeth on the transmission belt 44. The teeth on the output pulley 42 mesh with the teeth on the transmission belt 44. Thus, the input pulley 38, the transmission belt 44, and the output pulley 42 rotate in conjunction with each other. The output shaft 40 is rotatably supported by bearings 78 and 80 (see FIG. 4) about the axis A.

The electric motor 30 rotates the rotary blade 4 through the power transmission mechanism 32. In this case, the power generated by the electric motor 30 is transmitted to the rotary blade 4 through the motor shaft (not illustrated), the planetary gear mechanism (not illustrated), the input shaft 36, the input pulley 38, the transmission belt 44, the output pulley 42, and the output shaft 40, in this order.

The belt housing 12 includes a shaft lock 46. The shaft lock 46 is biased upward with respect to the belt housing 12 by a spring. When the user pushes the shaft lock 46 downward against a biasing force of the spring, the output pulley 42 is locked and rotation of the output shaft 40 is inhibited. When the user stops pushing the shaft lock 46, the biasing force of the spring pushes the shaft lock 46 back upward. The output pulley 42 is then unlocked and rotation of the output shaft 40 is allowed.

As illustrated in FIG. 2, the power cutter 2 further includes a trigger switch 48, a trigger lever 50, a trigger lock 52, and an operation button 54. The trigger switch 48, the trigger lever 50, the trigger lock 52, and the operation button 54 are provided on the rear handle 18. The trigger lever 50 is at a position where it is operable by the index finger of the hand grasping the rear handle 18. When the trigger lever 50 is pulled up, the trigger switch 48 is pressed down. When the trigger switch 48 is pressed down, the trigger switch 48 outputs a trigger-on signal to the control unit 28. The control unit 28 operates the electric motor 30 while the trigger on signal is being outputted from the trigger switch 48. On the other hand, when the trigger lever 50 is not pulled up, the trigger switch 48 is not pressed down. When the trigger switch 48 is not pressed down, the trigger switch 48 outputs a trigger-off signal to the control unit 28. The control unit 28 stops the electric motor 30 while the trigger off signal is being outputted from the trigger switch 48. The trigger lock 52 is at a position where it is operable by the thumb of the hand grasping the rear handle 18. The trigger lock 52 is biased leftward with respect to the rear handle 18 by a spring (not illustrated). Normally, the trigger lock 52 locks the trigger lever 50 so that the trigger lever 50 does not press the trigger switch 48 down. In this state, a pull-up operation on the trigger lever 50 is prohibited. When the trigger lock 52 is pressed rightward against the biasing force of the spring, the trigger lever 50 is unlocked and the pull-up operation on the trigger lever 50 is allowed. Therefore, the user can operate the electric motor 30 and rotate the rotary blade 4 by pulling up the trigger lever 50 with the trigger lock 52 pushed in.

The operation button 54 is located on the top surface of the rear handle 18. In the present embodiment, the control unit 28 starts or stops supplying power to a lighting device (not illustrated) provided on the front surface of the main housing 10 in response to operation on the operation button 54. That is, the operation button 54 is a button for switching on and off the lighting device.

(Rotary Blade Support Mechanism 56)

Figure 4:
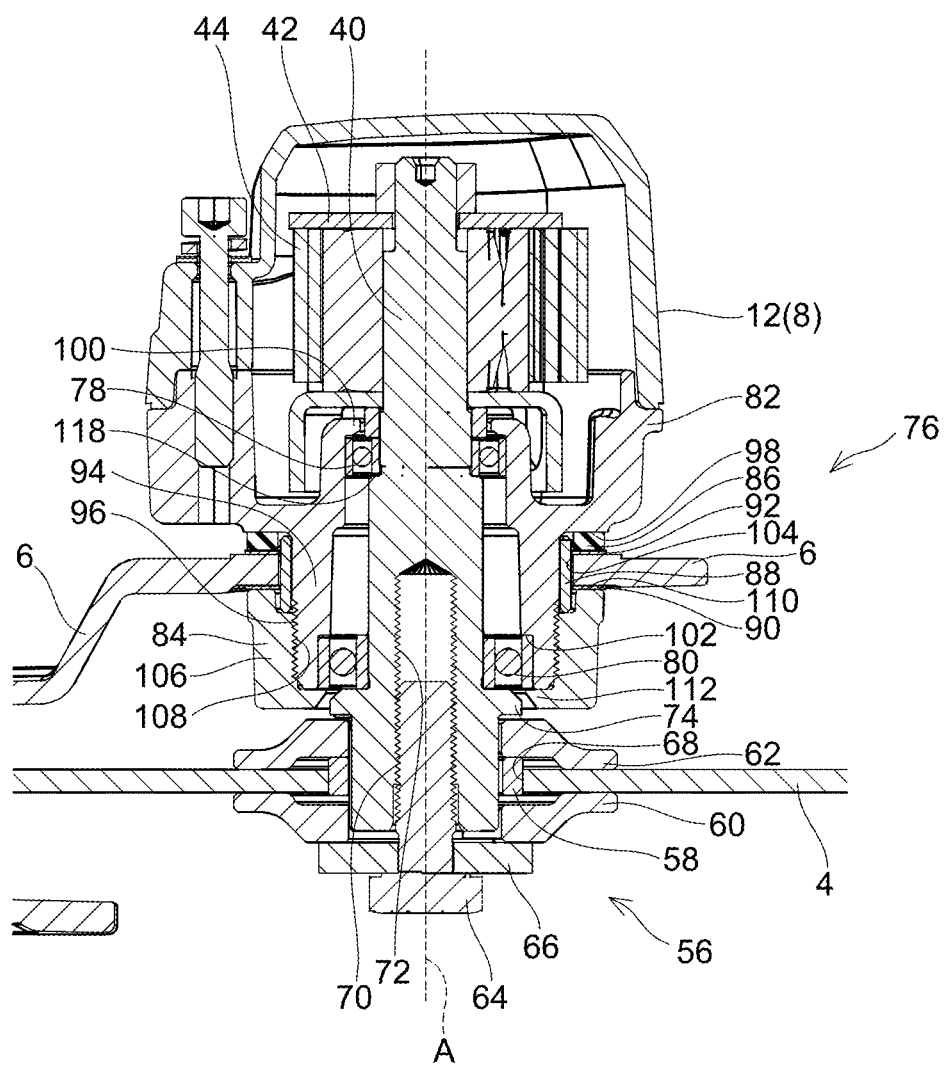
FIG. 4 is a cross-sectional view of a structure of a rotary blade support mechanism 56 and a cover retainment mechanism 76 of the power cutter 2 of the embodiment and their vicinity, taken along the V-V line in FIG. 2.
Figure 4:
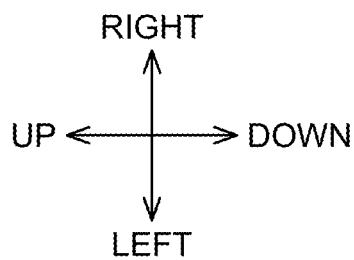

As illustrated in FIG. 4, the power cutter 2 further includes a rotary blade support mechanism 56. The rotary blade support mechanism 56 is provided on the output shaft 40. The rotary blade support mechanism 56 supports the rotary blade 4 so that the rotary blade 4 is fixed to the output shaft 40. The rotary blade support mechanism 56 includes a ring bush 58, a left flange 60, a right flange 62, a bolt 64, and a washer 66. The ring bush 58 is slidably and rotatably attached to the output shaft 40. The ring bush 58 enters a through hole 68 in the rotary blade 4 together with the output shaft 40. The ring bush 58 is provided to close a gap between the output shaft 40 and the periphery of the through hole 68. The left flange 60 and the right flange 62 have a substantially disk shape that extends about the axis A. The left flange 60 and the right flange 62 are slidably and non-rotatably attached to the output shaft 40. A center portion the left flange 60 is offset leftward relative to the left surface of the rotary blade 4, and the left flange 60 is in contact with the left surface of the rotary blade 4 at a portion radially outside the center portion. A center portion of the right flange 62 is offset rightward relative to the right side of the rotary blade 4, and the right flange 62 is in contact with the right surface of the rotary blade 4 at a portion radially outside the center portion. The bolt 64 is a hexagonal bolt, for example, and includes an outer thread 70. The outer thread 70 is screwed onto an inner thread 72 defined on the output shaft 40. The washer 66 is provided between the head of the bolt 64 and the left flange 60.

The bolt 64 fastens the right flange 62, the rotary blade 4, the left flange 60, and the washer 66 to the output shaft 40. In this state, the right flange 62, the rotary blade 4, the left flange 60, and the washer 66 are clamped between a flange 74 provided on the output shaft 40 and the head of the bolt 64. Consequently, the rotary blade 4 is fastened to the output shaft 40.

Figure 5:
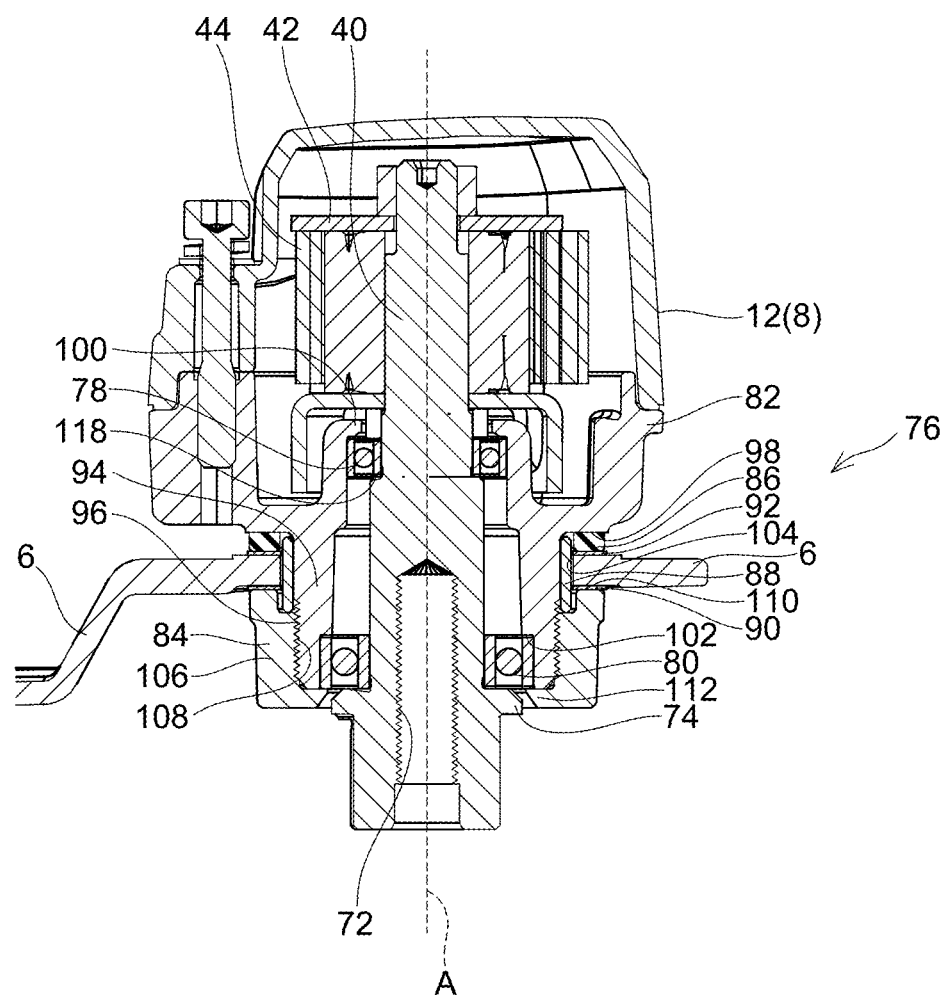
FIG. 5 is a cross-sectional view of the structure of the cover retainment mechanism 76 of the power cutter 2 of the embodiment and its vicinity, taken along the V-V line in FIG. 2.
Figure 5:
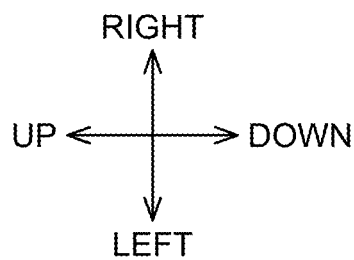

The user can detach the bolt 64 (and the washer 66) from the output shaft 40 by loosening the bolt 64. With the bolt 64 (and the washer 66) is detached from the output shaft 40, the user can detach the left flange 60, the rotary blade 4, the ring bush 58, and the right flange 62 by sliding each of them leftward with respect to the output shaft 40. This allows the user to detach the rotary blade 4 and the rotary blade support mechanism 56 from the output shaft 40. The state where the rotary blade 4 and rotary blade support mechanism 56 have been detached from the output shaft 40 is illustrated in FIG. 5.

(Cover Retainment Mechanism 76)

The power cutter 2 further includes a cover retainment mechanism 76. The cover retainment mechanism 76 is provided at the belt housing 12. The cover retainment mechanism 76 supports the blade cover 6 rotatably about the axis A. Further, the cover retainment mechanism 76 rotatably supports the output shaft 40 via two bearings 78 and 80. In the present embodiment, for convenience, one of the two bearings 78 and 80 having a smaller diameter is called "small diameter bearing 78" and the other of the two bearings 78 and 80 having a larger diameter is called "large diameter bearing 80".

Figure 6:
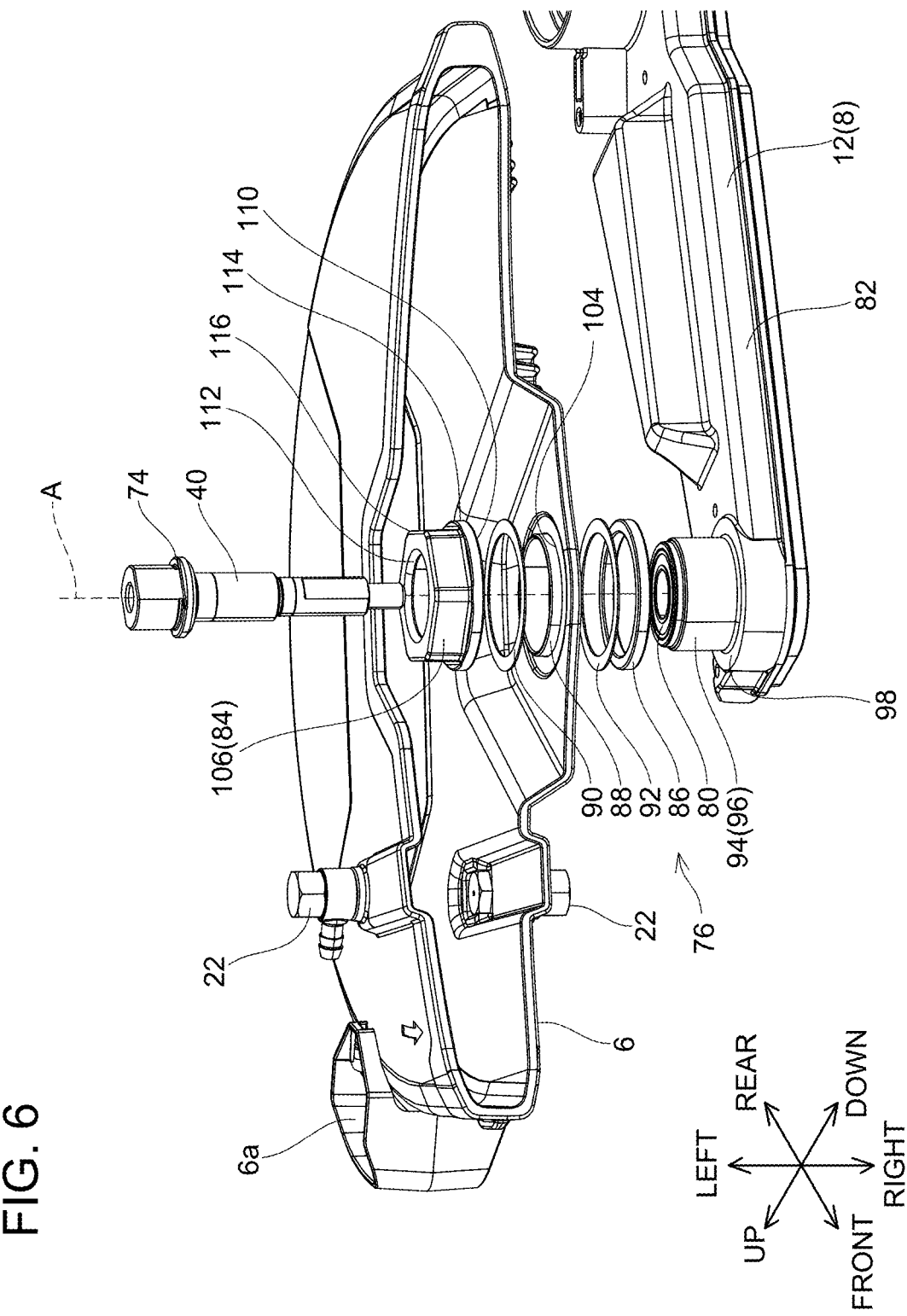
FIG. 6 illustrates an exploded view of the cover retainment mechanism 76 of the power cutter 2 of the embodiment.

As illustrated in FIG. 6, the cover retainment mechanism 76 includes a base member 82, a cap member 84, a rubber ring 86, a ring bush 88, a left washer 90, and a right washer 92.

As illustrated in FIG. 5, the base member 82 defines the left portion of the belt housing 12. The base member 82 is constituted of metal (e.g., a magnesium alloy). The base member 82 includes a first cylindrical portion 94, an outer thread 96, a first cover support surface 98, a small diameter bearing receiving portion 100, and a large diameter bearing receiving portion 102. One end of the first cylindrical portion 94 opens into the interior of the belt housing 12. The other end of the first cylindrical portion 94 is open to the outside of the belt housing 12. The output shaft 40 extends in the interior and the exterior of the belt housing 12 via the first cylindrical portion 94. The first cylindrical portion 94 extends such that it surrounds the output shaft 40. The outer thread 96 is defined on the outer circumferential surface of the first cylindrical portion 94. The first cover support surface 98 is a circularly defined flat surface around the first cylindrical portion 94. The first cover support surface 98 extends in the radial and circumferential directions of the axis A. The first cover support surface 98 supports the blade cover 6 in the leftward direction through the rubber ring 86 and the right washer 92. The small diameter bearing receiving portion 100 and the large diameter bearing receiving portion 102 are formed by providing steps on the inner circumferential surface of the first cylindrical portion 94. The small diameter bearing receiving portion 100 is in contact with the small diameter bearing 78 in the leftward direction. The large diameter bearing receiving portion 102 is in contact with the large diameter bearing 80 in the leftward direction.

The ring bush 88 is slidably and rotatably attached to the outer circumferential surface of the first cylindrical portion 94 of the base member 82. The ring bush 88 enters the through hole 104 defined in the blade cover 6 together with the first cylindrical portion 94. The ring bush 88 is positioned to close a gap between the first cylindrical portion 94 and the periphery of the through hole 104.

The cap member 84 is constituted of metal (e.g., an aluminum alloy). The cap member 84 includes a second cylindrical portion 106, an inner thread 108, a second cover support surface 110, and a large diameter bearing holding portion 112. The second cylindrical portion 106 is arranged radially outside the first cylindrical portion 94. The inner thread 108 is defined on the inner circumferential surface of the second cylindrical portion 106. The outer thread 96 of the base member 82 is screwed onto the inner thread 108. The second cover support surface 110 is a circularly defined flat surface at the right end of the second cylindrical portion 106. The second cover support surface 110 extends in the radial and circumferential directions of the axis A. The second cover support surface 110 supports the blade cover 6 in the rightward direction via the left washer 90. The large diameter bearing holding portion 112 protrudes inward in the radial direction of the axis A from the left end of the second cylindrical portion 106. The large diameter bearing holding portion 112 is in contact with the large diameter bearing 80 in the rightward direction.

The rubber ring 86, the right washer 92, the blade cover 6, and the left washer 90 are clamped between the first cover support surface 98 of the base member 82 and the second cover support surface 110 of the cap member 84. Consequently, the blade cover 6 is supported around the axis A. A force clamping the blade cover 6 (also referred to as an axial force) depends on fastening torque of the cap member 84 (i.e., fastening torque of the inner thread 108 against the outer thread 96). Specifically, the larger the fastening torque of the cap member 84, the larger the force clamping the blade cover 6. The fastening torque of the cap member 84 is adjusted to the extent that the cap member 84 does not loosen easily during use by the user. For example, the fastening torque of the cap member 84 is in the range from 20 N·m to 35 N·m.

As illustrated in FIG. 6, the cap member 84 includes a guard portion 114 and a hexagonal portion 116. The guard portion 114 protrudes outward in the radial direction of the axis A from the right end of the second cylindrical portion 106. The outer circumferential surface of the guard portion 114 has a cylindrical shape. The first cover support surface 98 corresponds to the lower surface of the guard portion 114. The hexagonal portion 116 is positioned to the left of the guard portion 114. The hexagonal portion 116 has a hexagonal prism shape of which central axis extends along the axis A. A person assembling the power cutter 2 can fasten the cap member 84 by holding the hexagonal portion 116 with a tool such as a wrench and rotating this tool about the axis A. The outer circumferential surface of the hexagonal portion 116 is located inward in the radial direction of the axis A from the outer circumferential surface of the guard portion 114.

As illustrated in FIG. 5, the small diameter bearing 78 is clamped between the small diameter bearing receiving portion 100 and the step 118 on the output shaft 40. Consequently, the small diameter bearing 78 is supported at a predetermined position. The large diameter bearing 80 is clamped between the large diameter bearing receiving portion 102 and the large diameter bearing holding portion 112. Consequently, the large diameter bearing 80 is supported at a predetermined position. The large diameter bearing 80 is supported at a position where it overlaps the outer thread 96 and the inner thread 108 when viewed in the direction orthogonal to the axis A. The expression "overlap" herein means that a portion of the large diameter bearing 80 projected along the radial direction of the axis A overlaps the outer thread 96 and the inner thread 108. The right end of the large diameter bearing 80 is located to the left of the right end of the outer thread 96 and to the right of the left end of the outer thread 96. The right end of the large diameter bearing 80 is located to the left of the right end of the inner thread 108 and to the right of the left end of the inner thread 108.

Figure 7:
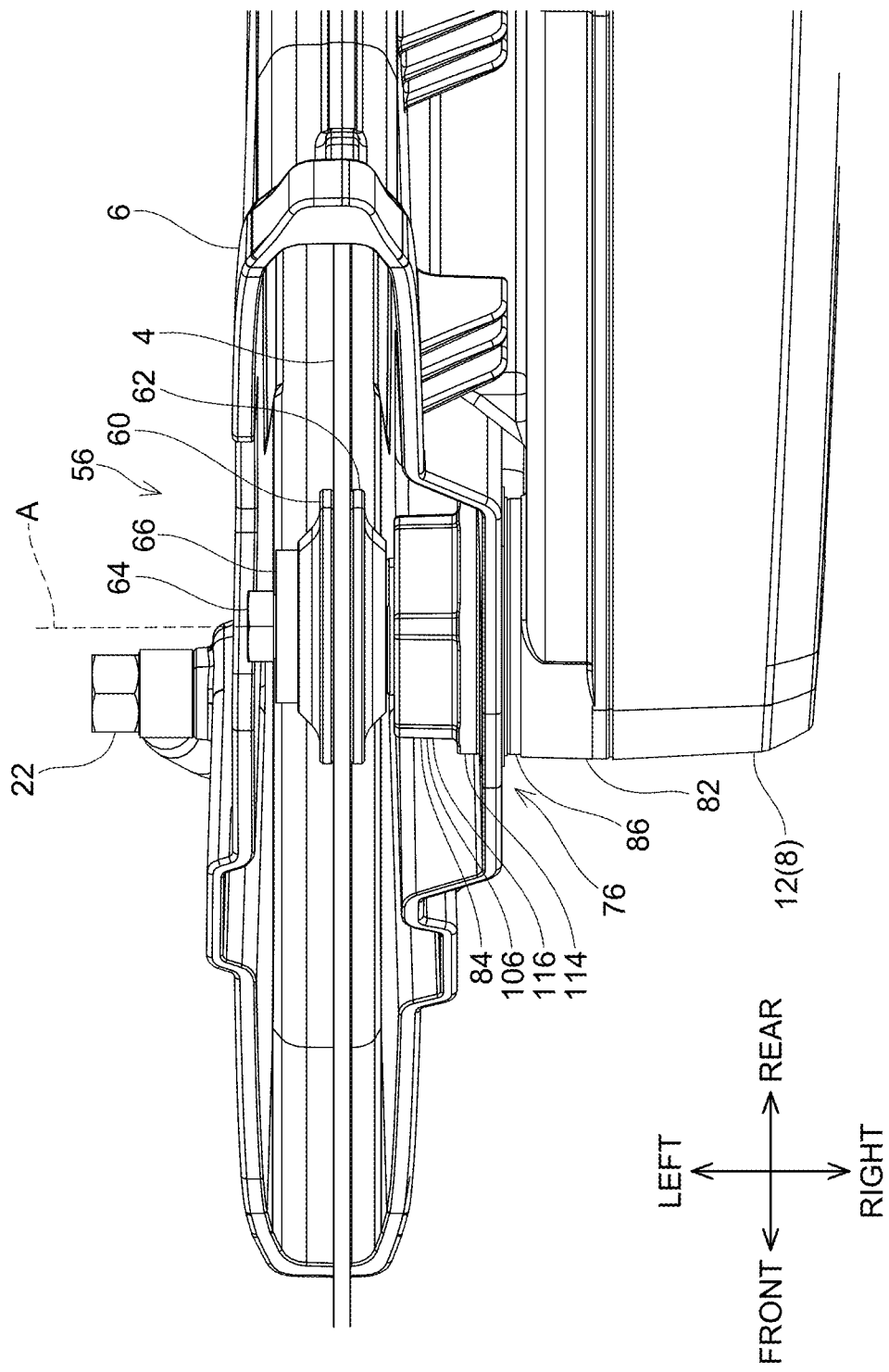
FIG. 7 illustrates the structure of the rotary blade support mechanism 56 and the cover retainment mechanism 76 of the power cutter 2 of the embodiment and their vicinity, as viewed from below.

As illustrated in FIG. 7, a portion of the cap member 84 having the largest outer diameter (the guard portion 114) is located inward in the radial direction of the axis A relative to a portion of the rotary blade support mechanism 56 having the largest outer diameter (the left flange 60 or the right flange 62). Accordingly, the outer circumferential surface of the cap member 84 is located inward in the radial direction of the axis A relative to the outer circumferential surface of the rotary blade support mechanism 56. The outer circumferential surface of the cap member 84 is also located inward in the radial direction of the axis A relative to the outer surface of the base member 82.

(Variants)

The working machine may be a working machine other than the power cutter 2. For example, the working machine may be an electric circular saw or a chip saw.

The working machine may include a prime mover other than the electric motor 30. For example, the working machine may include an engine.

The working machine may include a connector for connection to an external power source (e.g., a commercial power source). In this case, the working machine may operate on power supplied from the external power source instead of operating on power supplied from the battery pack B.

The base member 82 may include an inner thread instead of the outer thread 96. In this case, the cap member 84 may include an outer thread instead of the inner thread 108. The blade cover 6 may be supported around the axis A by fastening the outer thread of the cap member 84 against the inner thread of the base member 82.

The rotation axis of the blade cover 6 may not coincide with the rotation axis A of the rotary blade 4. For example, the rotation axis of the blade cover 6 may be slightly offset from the rotation axis A of the rotary blade 4. The rotation axis of the blade cover 6 may be slightly inclined with respect to the rotation axis A of the rotary blade 4.

The first cover support surface 98 (and/or the second cover support surface 110) may not continuously extend over the complete angle about the axis A. For example, the first cover support surface 98 (and/or the second cover support surface 110) may extend partially in the circumferential direction of the axis A. Alternatively, the first cover support surface 98 (and/or the second cover support surface 110) may be provided non-continuously along the circumferential direction of the axis A.

The cap member 84 may not include the large diameter bearing holding portion 112. Even in this case, the large diameter bearing 80 is clamped between the large diameter bearing receiving portion 102 and the flange 74 on the output shaft 40 and is supported at a predetermined position.

The base member 82 may not include the small diameter bearing receiving portion 100 (and/or the large diameter bearing receiving portion 102). In this case, a member to receive the small diameter bearing 78 (and/or the large diameter bearing 80) may be provided at the belt housing 12.

The large diameter bearing 80 may not be supported at a position where it overlaps the outer thread 96 and the inner thread 108 when viewed in the direction orthogonal to the axis A.

The cover retainment mechanism 76 may not include at least one of the rubber ring 86, the left washer 90, and the right washer 92. For example, the first cover support surface 98 may contact the right surface of the blade cover 6 to support the blade cover 6. The second cover support surface 110 may contact the left surface of the blade cover 6 and support the blade cover 6.

An elastic member equivalent to the rubber ring 86 may be provided between the second cover support surface 110 and the blade cover 6. In this case, the rubber ring 86 may or may not be provided between the first cover support surface 98 and the blade cover 6.

At least a portion of the outer circumferential surface of the cap member 84 may be at a position outward in the radial direction of the axis A relative to the outer circumferential surface of the rotary blade support mechanism 56. At least a portion of the outer circumferential surface of the cap member 84 may be at a position outward in the radial direction of the axis A relative to the outer surface of the base member 82.

The shape of the outer surface of the cap member 84 may be suitably changed. For example, the hexagonal portion 116 may be replaced with a different polygonal prismatic shape (e.g., square or octagonal prismatic shape). Alternatively, the hexagonal portion 116 may be replaced with a cylindrical shape. In this case, it may be impossible to hold the cap member 84 with a tool such as a wrench.

The material used for the cap member 84 is not limited to an aluminum alloy. For example, a metal other than an aluminum alloy (e.g., a magnesium alloy) may be used for the cap member 84. Alternatively, plastic (e.g., nylon) may be used for the cap member 84.

The material used for the base member 82 is not limited to a magnesium alloy. For example, a metal other than a magnesium alloy (e.g., an aluminum alloy) may be used for the base member 82. Alternatively, plastic (e.g., nylon) may be used for the base member 82.

Features of Embodiments

As described above, in one or more embodiments, the power cutter 2 (an example of a working machine) comprises: the rotary blade 4 configured to cut an object; the output shaft 40 to which the rotary blade 4 is attached; the electric motor 30 (an example of a prime mover) configured to rotate the output shaft 40; the power cutter body 8 (an example of a working machine body) that rotatably supports the output shaft 40 and houses the electric motor 30; the blade cover 6 partially covering the rotary blade 4; and the cover retainment mechanism 76 disposed on the power cutter body 8 and rotatably supporting the blade cover 6 about the axis A (an example of a cover rotation axis). The cover retainment mechanism 76 comprises: the base member 82 (an example of a first member) including: the first cylindrical portion 94 enclosing the output shaft 40; the outer thread 96 defined in the outer circumferential surface of the first cylindrical portion 94; and the first cover support surface 98 (an example of the first cover support portion) supporting the blade cover 6 in the leftward direction (an example of a first direction); and the cap member 84 (an example of a second member) including: the second cylindrical portion 106 disposed radially outside the first cylindrical portion 94; the inner thread 108 defined in the inner circumferential surface of the second cylindrical portion 106 and onto which the outer thread 96 is screwed; and the second cover support surface 110 (an example of a second cover support portion) supporting the blade cover 6 in the rightward direction (an example of a second direction).

According to the above configuration, by allowing the output shaft 40 to extend through inside the first cylindrical portion 94, the cover retainment mechanism 76 can avoid interfering with the output shaft 40. Then, by screwing the outer thread 96 defined in the outer circumferential surface of the first cylindrical portion 94 onto the inner thread 108 of the cap member 84, the blade cover 6 can be clamped between the base member 82 and the cap member 84. Therefore, there is no need to prepare the screw members as disclosed in Japanese Patent Application Publication No. 2019-188606. Accordingly, there is also no need to define the holes for attaching the screw members, by which the cover retainment mechanism 76 can be downsized in the radial direction of the axis A. Therefore, the maximum cutting depth of the rotary blade 4 can be increased.

In one or more embodiments, each of the first cover support surface 98 and the second cover support surface 110 supports the blade cover 6 over the substantially complete angle about the axis A.

If the first cover support surface 98 and the second cover support surface 110 do not support the blade cover 6 over the substantially complete angle about the axis A, the blade cover 6 may wobble with respect to the power cutter body 8. According to the above configuration, each of the first cover support surface 98 and the second cover support surface 110 supports the blade cover 6 over the substantially complete angle about the axis A. This suppresses the blade cover 6 from wobbling with respect to the power cutter body 8.

In one or more embodiments, the power cutter 2 further comprises the large diameter bearing 80 (an example of a bearing) rotatably supporting the output shaft 40. The base member 82 further includes the large diameter bearing receiving portion 102 (an example of a first bearing contact portion) contacting the large diameter bearing 80 in the leftward direction. The cap member 84 further includes the large diameter bearing holding portion 112 (an example of a second bearing contact portion) contacting the large diameter bearing 80 in the rightward direction.

According to the above configuration, the cover retainment mechanism 76 also functions as a detent for the large diameter bearing 80 by clamping the large diameter bearing 80. Therefore, there is no need to provide a separate detent for the large diameter bearing 80, thus the number of parts of the power cutter 2 can be reduced.

In one or more embodiments, the outer thread 96, the inner thread 108, and the large diameter bearing 80 overlap each other when viewed in the direction orthogonal to the axis A.

According to the above configuration, the cover retainment mechanism 76 can be downsized in the axial direction of the axis A.

In one or more embodiments, the rubber ring 86 (an example of an elastic member) is disposed between the first cover support surface 98 and the blade cover 6 (an example of "between the first cover support portion and the blade cover and/or between the second cover support portion and the blade cover").

It is expected that a hard material (e.g., metal) is used for each of the base member 82, the cap member 84, and the blade cover 6. Therefore, if the first cover support surface 98 and the blade cover 6 are in contact with each other, each of the first cover support surface 98 and the blade cover 6 will be significantly worn as the blade cover 6 rotates. According to the above configuration, the rubber ring 86 with relatively low hardness is provided between the first cover support surface 98 and the blade cover 6. Therefore, wear of the first cover support surface 98 and the blade cover 6 can be suppressed. Furthermore, according to the above configuration, wobbling of the blade cover 6 with respect to the power cutter body 8 can be suppressed.

In one or more embodiments, the power cutter 2 further comprises the rotary blade support mechanism 56 disposed on the output shaft 40 and retaining the rotary blade 4 such that the rotary blade 4 is fixed to the output shaft 40. When viewed in the direction orthogonal to the axis A (an example of a rotation axis of the output shaft), the outer circumferential surface of the cap member 84 (an example of a portion of the cover retainment mechanism between the rotary blade and the blade cover) is located inward in the radial direction of the axis A of the axis A relative to the outer circumferential surface of the rotary blade support mechanism 56.

According to the above configuration, the cover retainment mechanism 76 can be downsized to the extent that it does not affect the maximum cutting depth of the rotary blade 4. This allows the maximum cutting depth of the rotary blade 4 to be as large as possible.

In one or more embodiments, the cap member 84 (an example of at least one of the first member and the second member) includes the hexagonal portion 116 (an example of a polygonal prismatic shape) of which central axis extends along the axis A.

If neither the base member 82 nor the cap member 84 has the hexagonal portion 116, the base member 82 and the cap member 84 cannot be held by a tool such as a wrench. In this case, it may be difficult for the manufacturer of the power cutter 2 (specifically, a person who assembles the power cutter 2) to fasten the outer thread 96 and the inner thread 108 with sufficient fastening torque. According to the above configuration, the cap member 84 has the hexagonal portion 116, thus the cap member 84 can be held by a tool such as a wrench. This makes it easier for the manufacturer of the power cutter 2 to fasten the outer thread 96 and the inner thread 108 with sufficient fastening torque.

In one or more embodiments, the cap member 84 (an example of at least one of the first member and the second member) is constituted of an aluminum alloy.

An aluminum alloys is relatively lightweight among metals. In addition, an aluminum alloy is easy to process into various shapes, including screws. According to the above configuration, an aluminum alloy is used for the cap member 84. Therefore, a weight of the cap member 84 can be reduced. Furthermore, the cap member 84 can be easily processed.

What is claimed is:

1. A working machine, comprising:
   a rotary blade configured to cut an object;
   an output shaft to which the rotary blade is attached;
   a prime mover configured to rotate the output shaft;
   a working machine body that rotatably supports the output shaft and houses the prime mover;
   a blade cover partially covering the rotary blade; and
   a cover retainment mechanism disposed on the working machine body and rotatably supporting the blade cover about a cover rotation axis,
   wherein
   the cover retainment mechanism comprises:
      a first member including:
         a first cylindrical portion enclosing the output shaft;
         an outer thread defined in an outer circumferential surface of the first cylindrical portion; and
         a first cover support portion supporting the blade cover in a first direction which is along the cover rotation axis; and
      a second member including:
         a second cylindrical portion disposed radially outside the first cylindrical portion;
         an inner thread defined in an inner circumferential surface of the second cylindrical portion and onto which the outer thread is screwed; and
         a second cover support portion supporting the blade cover in a second direction which is opposite to the first direction.

2. The working machine according to claim 1, wherein each of the first cover support portion and the second cover support portion supports the blade cover over a substantially complete angle about the cover rotation axis.

3. The working machine according to claim 2, further comprising a bearing rotatably supporting the output shaft, wherein
   the first member further includes a first bearing contact portion contacting the bearing in the first direction,
   the second member further includes a second bearing contact portion contacting the bearing in the second direction,
   the outer thread, the inner thread, and the bearing overlap each other when viewed in a direction orthogonal to the cover rotation axis,
   an elastic member is disposed between the first cover support portion and the blade cover and/or between the second cover support portion and the blade cover,
   the working machine further comprises a rotary blade support mechanism disposed on the output shaft and retaining the rotary blade such that the rotary blade is fixed to the output shaft,
   when viewed in a direction orthogonal to a rotation axis of the output shaft, an outer circumferential surface of a portion of the cover retainment mechanism between the rotary blade and the blade cover is located inward in a radial direction of the rotation axis of the output shaft relative to an outer circumferential surface of the rotary blade support mechanism,
   at least one of the first member and the second member includes a polygonal prismatic shape of which central axis extends along the cover rotation axis, and
   at least one of the first member and the second member is constituted of an aluminum alloy.

4. The working machine according to claim 1, further comprising a bearing rotatably supporting the output shaft, wherein
   the first member further includes a first bearing contact portion contacting the bearing in the first direction, and
   the second member further includes a second bearing contact portion contacting the bearing in the second direction.

5. The working machine according to claim 4, wherein the outer thread, the inner thread, and the bearing overlap each other when viewed in a direction orthogonal to the cover rotation axis.

6. The working machine according to claim 1, wherein an elastic member is disposed between the first cover support portion and the blade cover and/or between the second cover support portion and the blade cover.

7. The working machine according to claim 1, further comprising a rotary blade support mechanism disposed on the output shaft and retaining the rotary blade such that the rotary blade is fixed to the output shaft,
   wherein
   when viewed in a direction orthogonal to a rotation axis of the output shaft, an outer circumferential surface of a portion of the cover retainment mechanism between the rotary blade and the blade cover is located inward in a radial direction of the rotation axis of the output shaft relative to an outer circumferential surface of the rotary blade support mechanism.

8. The working machine according to claim 1, wherein at least one of the first member and the second member includes a polygonal prismatic shape of which central axis extends along the cover rotation axis.

9. The working machine according to claim 1, wherein at least one of the first member and the second member is constituted of an aluminum alloy.

\* \* \* \* \*